US011055791B1

(12) United States Patent
Moore et al.

(10) Patent No.: US 11,055,791 B1
(45) Date of Patent: Jul. 6, 2021

(54) SYSTEMS AND METHODS FOR AUTOMATED TELLER DRAWER COUNTING AND BALANCING

(71) Applicant: Wells Fargo Bank, N.A., San Francisco, CA (US)

(72) Inventors: Alicia Y. Moore, San Ramon, CA (US); Miranda C. Hill, Seattle, WA (US); Susan Symons, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 15/388,008

(22) Filed: Dec. 22, 2016

Related U.S. Application Data

(60) Provisional application No. 62/317,389, filed on Apr. 1, 2016.

(51) Int. Cl.
*G06Q 40/00* (2012.01)
*G07D 11/50* (2019.01)
*G06Q 20/00* (2012.01)

(52) U.S. Cl.
CPC .............. *G06Q 40/12* (2013.12); *G07D 11/50* (2019.01); *G06Q 20/00* (2013.01)

(58) Field of Classification Search
CPC .... G06Q 40/128; G06Q 40/125; G06Q 40/12; G07D 11/50
USPC .................................. 705/30, 33, 35, 39, 43
See application file for complete search history.

(56) References Cited

U.S. PATENT DOCUMENTS

| | | | | |
|---|---|---|---|---|
| 7,451,103 B1 * | 11/2008 | Boyle | ..................... | G06Q 20/10 |
| | | | | 705/35 |
| 8,011,581 B1 * | 9/2011 | Folk | ...................... | G07G 1/0027 |
| | | | | 235/379 |
| 8,141,772 B1 * | 3/2012 | Folk | ....................... | G06Q 20/20 |
| | | | | 194/206 |
| 8,162,125 B1 * | 4/2012 | Csulits | ..................... | G07D 7/12 |
| | | | | 194/206 |
| 8,177,132 B1 * | 5/2012 | Bohen | ................. | G07D 11/0066 |
| | | | | 235/385 |
| 8,550,338 B1 * | 10/2013 | Nichols | ................... | G06Q 10/08 |
| | | | | 235/375 |
| 8,556,166 B1 * | 10/2013 | Folk | ....................... | G07F 19/209 |
| | | | | 235/379 |
| 8,756,158 B2 * | 6/2014 | Colvin | .................... | G07D 11/36 |
| | | | | 705/43 |

(Continued)

FOREIGN PATENT DOCUMENTS

WO WO2005071623 * 8/2005 ............. G01G 19/42

*Primary Examiner* — Florian M Zeender
*Assistant Examiner* — Nicole Elena Bruner
(74) *Attorney, Agent, or Firm* — Foley & Lardner LLP

(57) ABSTRACT

Systems, methods, and apparatuses using a processor coupled to a non-transitory machine-readable medium storing instructions. The processor is structured to count a first amount of currency, wherein the first amount of currency is the actual amount of currency received by a teller money drawer, receive an indication of a second amount of currency, wherein the second amount of currency is an expected amount of currency, compare the first amount of currency to the second amount of currency, discover a discrepancy between the first amount of currency and the second amount of currency, and transmit discrepancy information to be displayed on a teller computing device.

19 Claims, 4 Drawing Sheets

(56) References Cited

U.S. PATENT DOCUMENTS

| | | | | |
|---|---|---|---|---|
| 9,195,889 | B2* | 11/2015 | Klein | G06K 9/00469 |
| 2004/0083149 | A1* | 4/2004 | Jones | G06Q 40/00 |
| | | | | 705/35 |
| 2006/0186193 | A1* | 8/2006 | Nelson | G06Q 40/00 |
| | | | | 235/379 |
| 2009/0299828 | A1* | 12/2009 | Riddick | G06Q 40/00 |
| | | | | 705/35 |
| 2011/0106681 | A1* | 5/2011 | Cockerell | G06Q 10/06 |
| | | | | 705/35 |
| 2013/0232064 | A1* | 9/2013 | Bosch | G06Q 10/087 |
| | | | | 705/43 |
| 2014/0339301 | A1* | 11/2014 | Angus | G07D 11/30 |
| | | | | 235/379 |
| 2016/0162860 | A1* | 6/2016 | Gonzalez | G06Q 20/203 |
| | | | | 705/21 |
| 2016/0196553 | A1* | 7/2016 | Barhydt | G06Q 20/3829 |
| | | | | 705/71 |
| 2017/0003856 | A1* | 1/2017 | Mande | G06Q 30/016 |

\* cited by examiner

SYSTEMS AND METHODS FOR AUTOMATED TELLER DRAWER COUNTING AND BALANCING

CROSS-REFERENCE TO RELATED APPLICATIONS

This application claims priority to U.S. Provisional Patent Application No. 62/317,389 entitled "SYSTEMS AND METHODS FOR AUTOMATED TELLER DRAWER COUNTING AND BALANCING", filed Apr. 1, 2016, incorporated herein by reference in its entirety.

TECHNICAL FIELD

Embodiments of the present disclosure relate generally to the field of currency counting and balancing.

BACKGROUND

Financial institutions desire to efficiently and accurately determine when discrepancies in the expected currency and the actual currency in teller drawers and/or vaults occur. Traditionally, at the end of a shift, tellers at financial institutions reconcile the teller drawers with the transactions that were processed during their respective shift. In a conventional system, the tellers must recount the currency in the teller drawers by hand, having to recount each time a discrepancy between the actual amount of currency and the expected amount of currency is found. Counting and recounting currency by hand is inaccurate and inefficient and thus, in addition to wasting time, currency discrepancies may never be discovered.

SUMMARY

A first example embodiment relates to a system. The system includes a currency counting device and a processing circuit. The processing circuit is communicably coupled to the currency counting device. The processing circuit includes a processor and memory. The memory is structured to store instructions that are executable by the processor and cause the processing circuit to cause a first amount of currency to be counted by the currency counting device, wherein the first amount of currency is the actual amount of currency received by a teller money drawer, receive an indication of a second amount of currency, wherein the second amount of currency is an expected amount of currency, compare the first amount of currency to the second amount of currency, discover a discrepancy between the first amount of currency and the second amount of currency, and transmit discrepancy information to be displayed on a teller computing device.

Another example embodiment relates to a method. The method includes counting, by a currency counting circuit, a first amount of currency, wherein the first amount of currency is the actual amount of currency received by a teller money drawer, receiving, by a teller transaction circuit, an indication of a second amount of currency, wherein the second amount of currency is an expected amount of currency, comparing, by a discrepancy circuit, the first amount of currency to the second amount of currency, discovering, by the discrepancy circuit, a discrepancy between the first amount of currency and the second amount of currency, and transmitting, by a display circuit, discrepancy information to be displayed on a teller computing device.

A further example embodiment relates to an apparatus. The apparatus includes a currency counting circuit structured to count a first amount of currency, wherein the first amount of currency is the actual amount of currency received by a teller money drawer, a teller transaction circuit structured to receive an indication of a second amount of currency, wherein the second amount of currency is an expected amount of currency, a discrepancy circuit structured to compare the first amount of currency to the second amount of currency, and discover a discrepancy between the first amount of currency and the second amount of currency, a display circuit structured to transmit discrepancy information to be displayed on a teller computing device.

These and other features, together with the organization and manner of operation thereof, will become apparent from the following detailed description when taken in conjunction with the accompanying drawings.

DETAILED DESCRIPTION

Figure 1:
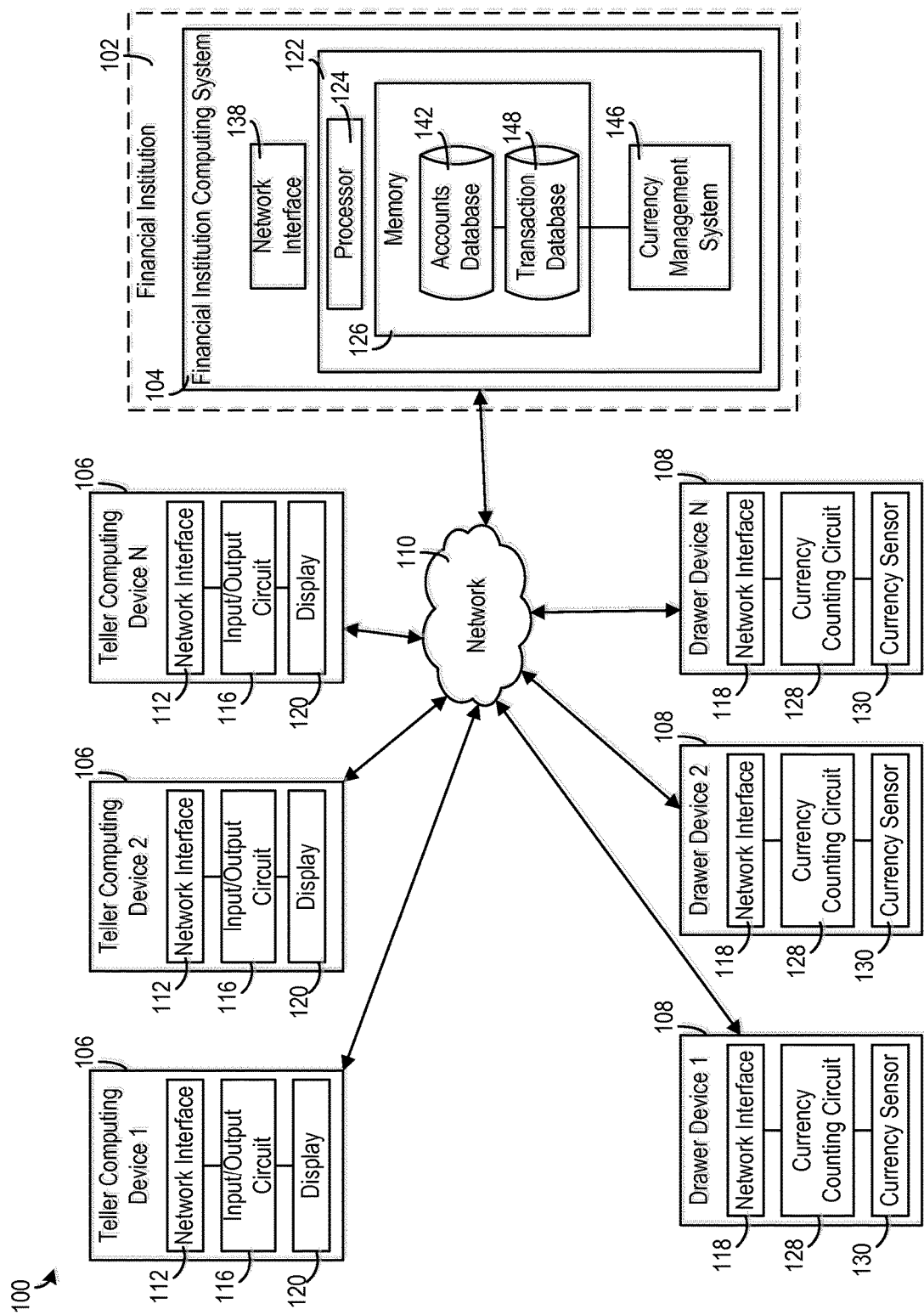
FIG. 1 is a schematic diagram of a currency management system, according to an example embodiment.

Referring to the Figures generally, various systems, methods, and apparatuses for facilitating currency management at a financial institution are described herein. More particularly, systems and methods for facilitating counting and reconciliation of discrepancies in the expected amount of currency and the actual amount of currency in a teller drawer are described herein.

According to various example embodiments, as described in further detail below, facilitating management of currency in a financial institution in an automated system may improve the ability to count the currency more accurately and efficiently than is done with a manual counting and balancing system. Unlike conventional currency management, among various other functionality, the embodiments described herein generate an analysis of when and during which transaction a currency discrepancy may have taken place. Further, the currency management system described herein may notify a teller of a discrepancy using a display of a teller computing device and may additionally recommend further action based on the discrepancy information identified.

An example implementation may be described as follows. A customer enters a financial institution (e.g., a bank branch) to conduct a transaction. During the transaction, a teller working at the financial institution receives currency from and/or gives currency to the customer based on the type of transaction (e.g., deposit, withdrawal, transfer). The teller deposits the currency into or takes the currency from a teller drawer, herein referred to as a drawer device. Concurrently, the teller enters transaction information into a teller computing device, which then stores the transaction information into the transaction database located with the financial institution computing system. After a set period of time (e.g., one shift, one hour, one day) and often after a plurality of transactions have occurred, the teller reconciles the drawer device with the transactions that are stored and available for review on the teller computing device. Specifically, the teller reconciles the drawer device to ensure that the actual amount of funds in the drawer device matches an expected amount of funds in the drawer device. Rather than count the currency in the drawer device manually, the contemplated currency management system monitors the drawer device at all times to identify any potential discrepancies between what is noted in the transaction database and the amount of currency contained within the drawer device. Beneficially, any discrepancies may be known contemporaneously or substantially contemporaneously to any mismatch occurring. Accordingly, upon detection of a problem, the currency management system generates and provides a message to the teller computing device to display the potential discrepancy and any related information about the discrepancy.

In operation, the currency management system facilitates the real-time display of currency discrepancies for each drawer device at a financial institution. Each teller is responsible for a particular drawer device such that each teller may receive displays relating to that device. Other personnel, such as managers at the financial institution, may receive notifications regarding all of the drawer devices to monitor the activity of the tellers and each of the drawers. Other embodiments may include different arrangements and displays without departing from the spirit and scope of the present disclosure.

Referring now to FIG. 1, a block diagram of a system 100 is shown, according to an example embodiment. As described in further detail below, the system 100 facilitates currency management in a financial institution 102. Specifically, the system 100 facilitates the determination of discrepancy information relating to transactions in a financial institution 102. As used herein, the term "currency" refers to fiat currency, such as paper money and coin money that is declared by a government to be legal tender (e.g., US Dollars, Canadian Dollars, Chinese Yuan, Euros, Japanese Yen, etc.). In some arrangements, the system 100 additionally facilitates the recommendation of further action when a discrepancy is determined to have occurred. The system 100 receives an amount of currency during a transaction between a customer and a teller at the financial institution 102. The system 100 then counts the currency, compares the actual amount of currency to the expected amount of currency, and facilitates the determination of discrepancy information. Further, the system 100 recommends actions to be taken based on the determination of discrepancy information, such as a manual recount of the teller drawer.

As shown, the system 100 includes a financial institution computing system 104 associated with a financial institution 102, the financial institution computing system 104 is communicably and operatively coupled to one or more teller computing devices 106 and one or more drawer devices 108 over a network 110. The network 110 provides communicable and operative coupling between the teller computing devices 106, drawer devices 108, and the financial institution computing system 104, and other components disclosed and described herein to provide and facilitate the exchange of communications (e.g., data, instructions, messages, values, commands, etc.) Accordingly, the network 110 may include any network including wired (e.g., Ethernet) and/or wireless networks (e.g., 802.11X, ZigBee, Bluetooth, WiFi, etc.). In some arrangements, the network 110 includes the Internet. In further embodiments, the network 110 includes a proprietary banking network to provide secure or substantially secure communications.

As shown, the system 100 depicts multiple teller computing devices 106 (e.g., teller computing device 1, teller computing device 2, etc.) and multiple drawer devices 108 (e.g., drawer device 1, drawer device 2, etc.). This depiction is for illustrative purposes only to show an implementation environment of the systems and methods described herein. Each of these entities may have the same or similar characteristics. For the purpose of clarity, the disclosure contained herein is in reference to a single teller computing device and a single drawer device.

The teller computing device 106 includes any type of computing device that may be used to facilitate management of currency within the financial institution 102. In some arrangements, the teller uses the teller computing device 106 to assist customers of the financial institution 102 with in-person transactions. In this regard, the teller computing device 106 may include any wearable and non-wearable device. Wearable devices refer to any type of device that an individual wears including, but not limited to, a watch (e.g., smart watch), glasses (e.g., eye glasses, sunglasses, smart glasses, etc.), bracelet (e.g., a smart bracelet), etc. Teller computing device 106 may also include any type of mobile device including, but not limited to, a phone (e.g., smart phone, etc.) and/or computing devices (e.g., desktop computer, laptop computer, personal digital assistant, etc.).

The teller computing device 106 further includes a display 120, an input/output circuit 116, and network interface 112. The network interface 112 of the teller computing device 106 is adapted for and configured to establish a communication session via the network 110 with the financial institution computing system 104 and the drawer device 108. Accordingly, the network interface 112 includes any of a cellular transceiver (Code Division Multiple Access (CDMA), Global System for Mobile Communications (GSM), Long-Term Evolution (LTE), etc.), a wireless network transceiver (e.g., 802.11X, ZigBee, Bluetooth, etc.), or a combination thereof (e.g., both a cellular transceiver and a Bluetooth transceiver). In some embodiments, the network interface 112 communicates via a secured wired connection within a branch of the financial institution 102.

The display 120 is used to present account information, transaction information, and the like to tellers on the teller computing device 106. In this regard, the display 120 is communicably and operatively coupled to the input/output circuit 116 to provide a user interface for receiving and displaying information on the teller computing device 106. Examples of user interfaces are described more fully herein with regard to FIGS. 4 and 5.

The input/output circuit 116 is structured to receive and provide communication(s) to a user (e.g., a bank teller) of the teller computing device 106 (or, to another entity such as the drawer device 108). In this regard, the input/output circuit 116 is structured to exchange data, communications, instructions, etc. with an input/output component of the teller computing device 106. Accordingly, in one embodiment, the input/output circuit 116 includes an input/output device such as a display device, a touchscreen, a keyboard, and a microphone. In another embodiment, the input/output circuit 116 may include communication circuitry for facilitating the exchange of data, values, messages, and the like between an input/output device and the components of the teller computing device 106. In yet another embodiment, the input/output circuit 116 may include machine-readable media for facilitating the exchange of information between the input/output device and the components of the teller computing device 106. In still another embodiment, the input/output circuit 116 may include any combination of hardware components (e.g., a touchscreen), communication circuitry, and machine-readable media.

The drawer device 108 may include any type of storage device that may be used by a teller, or other financial institution personnel, to store and access currency at a financial institution 102. In this regard, the drawer device 108 may include any sliding-type teller drawer used to store currency, which can be locked and unlocked by the teller during a transaction, and may also include vault-type storage, which may be used to store higher denominations of currency which require a more secure type of storage.

The drawer device 108 further includes a currency counting circuit 128, a currency sensor 130, and network interface 118. The network interface 118 of the drawer device 108 is adapted for and configured to establish a communication session via the network 110 with the financial institution computing system 104 and the teller computing device 106. Accordingly, the network interface 118 includes any of a cellular transceiver (Code Division Multiple Access (CDMA), Global System for Mobile Communications (GSM), Long-Term Evolution (LTE), etc.), a wireless network transceiver (e.g., 802.11X, ZigBee, Bluetooth, etc.), or a combination thereof (e.g., both a cellular transceiver and a Bluetooth transceiver). In some embodiments, the network interface 118 communicates via a secured wired connection within a branch of the financial institution 102.

The currency sensor 130 is structured to receive the currency deposited into the drawer device 108, count the currency, and communicate the amount of currency to the currency counting circuit 128. In this regard, the currency sensor 130 is communicably and operatively coupled to the currency counting circuit 128 to facilitate the process. The currency sensor 130 includes any type of sensor to count the currency. In some embodiments, the currency sensor 130 includes paper money counters structured to count paper money by mechanically pulling each bill through the sensor and by counting the number bills and types of bills (e.g., by scanning identifying codes, by interpreting the number of times a beam of light is interrupted, by comparing an image of each bill to pattern recognition criteria, etc.). Accordingly, in some embodiments, the currency sensor 130 distinguishes between the denominations of bills and/or the type of currency (e.g., US Dollars, Canadian Dollars, etc.). In some embodiments, the currency sensor 130 includes coin counters structured to both sort and count coins simultaneously (e.g., by scanning identifying codes, by interpreting the number of times a beam of light is interrupted, by comparing an image of each coin to pattern recognition criteria, etc.). In further embodiments, the currency sensor 130 is additionally equipped to distinguish genuine currency from counterfeit currency.

The currency counting circuit 128 is structured to receive the counted currency amount from the currency sensor 130 and communicate that information to the teller computing device 106. In this regard, the currency counting circuit 128 is communicably and operatively coupled to the currency sensor 130 and the teller computing device 106. In one embodiment, the currency counting circuit 128 includes various hardware components, such as a transmitter, to facilitate the sending of currency amount information to the currency management system 146 via the network 110. In another embodiment, the currency counting circuit 128 includes communication circuitry including, but not limited to, wired and wireless communication protocol to facilitate transmission of the currency amount information from the currency sensor 130 to the currency management system 146. In yet another embodiment, the currency counting circuit 128 includes any combination of hardware components (e.g., a transmitter) and communication circuitry.

Still referring to FIG. 1, the system 100 includes the financial institution computing system 104. The financial institution computing system 104 includes a network interface 138, which is used to establish connections with other components of the system 100 by way of network 110. The network interface 138 includes program logic that facilitates connection of the financial institution computing system 104 to the network 110. The network interface 138 supports communication between the financial institution computing system 104 and other systems, such as the teller computing device 106 and the drawer device 108. For example, the network interface 138 includes a cellular modem, a Bluetooth transceiver, a Bluetooth beacon, a radio-frequency identification (RFID) transceiver, and a near-field communication (NFC) transmitter. In some embodiments, the network interface 138 communicates via a secured wired connection within a branch of the financial institution 102. In some arrangements, the network interface 138 includes the hardware and machine-readable media sufficient to support communication over multiple channels of data communication. Further, in some arrangements, the network interface 138 includes cryptography capabilities to establish a secure or relatively secure communication session with the financial institution computing system 104, teller computing device 106, and drawer device 108. In this regard, financial data (or other types of data) may be encrypted and transmitted to prevent or substantially prevent the threat of hacking.

The financial institution computing system 104 further includes an accounts database 142. The accounts database 142 is configured to hold, store, categorize, and otherwise serve as a repository for information associated with accounts held by the financial institution 102. For example, the accounts database 142 may store account numbers, account balances, account ownership information, and the like. The accounts database 142 is structured to selectively provide access to information relating to an account at the financial institution 102. In this regard, as discussed further herein, the accounts database 142 is communicably and operatively coupled to the currency management system 146 to provide access to such information, such that the currency management system 146 may facilitate the determination of discrepancies in actual currency and expected currency at the financial institution 102 and recommend further action based on that information.

The financial institution computing system 104 further includes a transaction database 148. The transaction database 148 is configured to hold, store, categorize, and otherwise serve as a repository for transaction information. The transaction database 148 is structured to selectively provide access to information relating to one or more transactions that occur at a financial institution 102. In this regard, the transaction database 148 is communicably and operatively coupled to the currency management system 146 to provide access to such information, such that the currency management system 146 may use that information to determine during which transaction a currency discrepancy has taken place. Such processes are described more fully herein below.

As used herein, "transaction information" may include any information that a teller at a financial institution 102 may enter on a teller computing device 106 during a transaction process with a customer. In some arrangements, the transaction information includes an amount of currency deposited into or an amount of currency withdrawn from an account at the financial institution, the time of the transaction, the account number involved with the transaction, the name of the account holder, and a unique transaction number that can be used to identify the particular transaction.

The financial institution computing system 104 includes a currency management system 146 for managing a currency counting and balancing process at the financial institution 102. The currency management system 146 is structured to count the accepted currency, receive transaction information including the amount of currency deposited or withdrawn from an account, and discover discrepancies between the actual amount of currency in a teller drawer and the expected amount of currency. In some embodiments, the currency management system 146 uses the transaction information to recommend further action to be taken by a teller when a discrepancy is discovered. The currency management system 146 may be configured to use transaction and account information stored in the transaction database 148 and accounts database 142, respectively, to determine which options and/or recommendations to provide to a teller when a discrepancy is discovered, according to an example embodiment. Further, in some arrangements, the currency management system 146 is configured to transmit a message for display to a teller computing system reflecting recommendations for further action.

Figure 2:
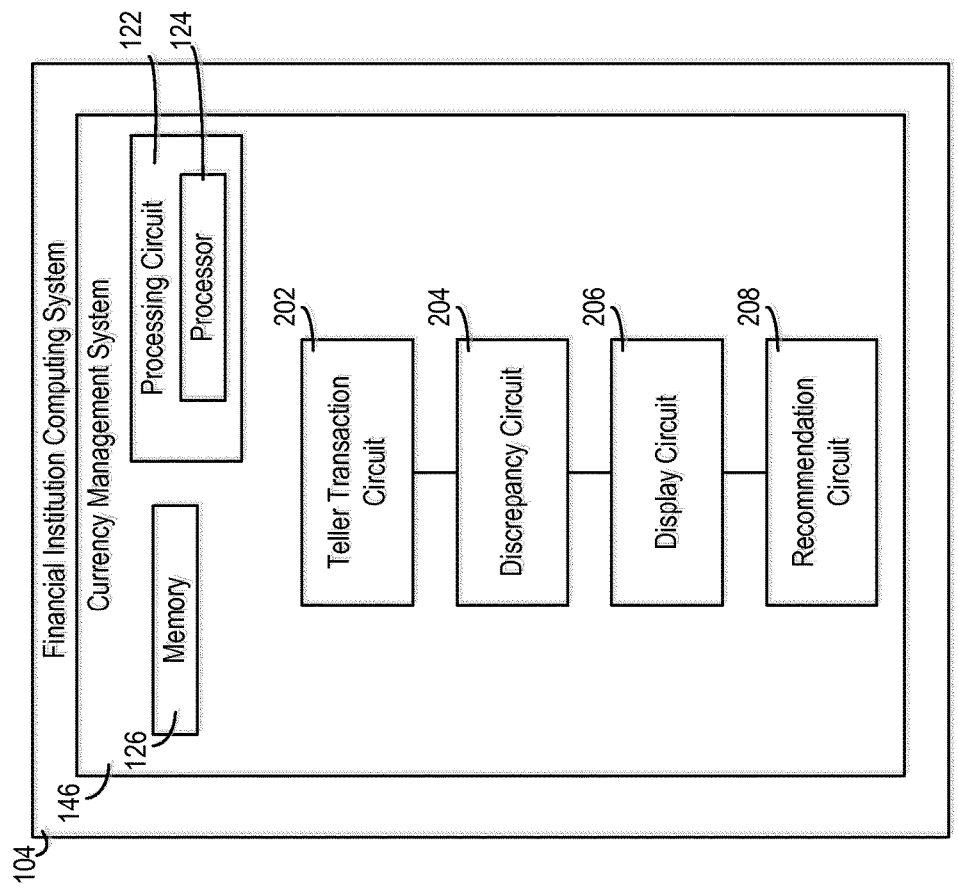
FIG. 2 is a diagram of the currency management system of FIG. 1, according to an example embodiment.

Referring now to FIG. 2, a diagram of the currency management system 146 and part of the financial institution computing system 104 is shown according to an example embodiment. As shown, financial institution computing system 104 includes a processing circuit 122 having a processor 124 and a memory 126. The processor 124 may be implemented as a general-purpose processor, an application specific integrated circuit (ASIC), one or more field programmable gate arrays (FPGAs), a digital signal processor (DSP), a group of processing components, or other suitable electronic processing components. The one or more memory devices 126 (e.g., RAM, NVRAM, ROM, Flash Memory, hard disk storage, etc.) may store data and/or computer code for facilitating the various processes described herein. Moreover, the one or more memory devices 126 may be or include tangible, non-transient volatile memory or non-volatile memory. Accordingly, the one or more memory devices 126 may include database components, object code components, script components, or any other type of information structure for supporting the various activities and information structures described herein.

The currency management system 146 may be embodied with the financial institution computing system 104. Accordingly, in some arrangements, the currency management system 146 may be embodied or at least partly embodied in the memory 126, where at least some operations may be executable from the processing circuit 122. As described above, the currency management system 146 facilitates counting and balancing currency in a drawer device 108 at the financial institution 102. The currency management system 146 determines when and during which transactions discrepancies in the expected and actual currency occur for a drawer device 108. Beneficially, such a system may facilitate efficient and accurate determinations of how and when discrepancies in currency at the financial institution 102 occur.

The currency management system 146 is shown to include a teller transaction circuit 202, a discrepancy circuit 204, a display circuit 206, and a recommendation circuit 208, with all such circuits communicably coupled to each other. Other embodiments may include more or less circuits without departing from the spirit and scope of the present disclosure. Further, some embodiments may combine the activities of one circuit with another circuit to form a single circuit. Therefore, those of ordinary skill in the art will appreciate that the present arrangement is not meant to be limiting.

The teller transaction circuit 202 is structured to receive information from the transaction database 148 regarding transaction information from transactions that occur at the financial institution 102. The teller transaction circuit 202 is additionally structured to receive information from a drawer device 108 regarding the amount of currency that has been counted by the currency sensor 130. Further, the teller transaction circuit 202 is structured to communicate the received information to the discrepancy circuit 204. In this regard, in one embodiment, the teller transaction circuit 202 is communicably and operatively coupled to the transaction database 148 to receive the information regarding an expected amount of currency and to a drawer device 108 to receive information regarding an actual amount of currency that is in the drawer device 108. In further embodiments, the teller transaction circuit 202 is additionally communicably and operatively coupled to the discrepancy circuit 204 to communicate the transaction information and currency counting information to the discrepancy circuit 204 for evaluation and discrepancy identification.

The discrepancy circuit 204 is structured to identify potential discrepancies in currency and determine when they may have occurred. The discrepancy circuit 204 compares an expected amount of currency to an actual amount of currency contained in a drawer device 108. The discrepancy circuit 204 receives information regarding the actual and expected amounts of currency from the teller transaction circuit 202 as mentioned above. This information may relate to a set time period, such as receiving transaction information for transactions occurring during a specific teller shift, hour, or day, etc. In some embodiments, the discrepancy circuit 204 is further be structured to communicate the identified discrepancies and information relating to the discrepancies (e.g., transaction information, account information) to the display circuit 206 so that the display circuit 206 generates a message to be displayed on a teller computing device 106. In this regard, the discrepancy circuit 204 may be communicably and operatively coupled to the teller transaction circuit 202 and to the display circuit 206.

The display circuit 206 is structured to generate and provide a message to the teller computing device 106 to display one or more sets of discrepancy information identified by the discrepancy circuit 204. In some arrangements, the display circuit 206 is also structured to generate and provide a message to the teller computing device 106 regarding possible further action that the teller may need to take. In this regard, the display circuit 206 may be communicably and operatively coupled to the discrepancy circuit 204 and the recommendation circuit 208.

The display circuit 206 is configured to create, generate, establish, update, and maintain a discrepancy list of all identified potential discrepancies and any information associated therewith. Accordingly, in one embodiment, the display circuit 206 includes a list generating tool. In another embodiment, the display circuit 206 includes communication circuitry for facilitating the exchange of information between and among the display circuit 206 and any other circuitry or logic. In yet another embodiment, the display circuit 206 includes any combination of machine-readable media, list generating tool, and communication circuitry. In further embodiments, the display includes a list of discrepancy information, wherein a teller (or any user of the teller computing device 106 may observe or search the list for information associated with the identified discrepancies. Information included in the list may include, but is not limited to, the drawer device 108 from which the amount of actual currency was counted, an identification of a transaction number associated with the discrepancy, the identified time that the discrepancy occurred, expected currency amount, and the actual currency amount.

The recommendation circuit 208 is structured to provide at least one recommended action based on the discrepancy information identified for a particular drawer device 108. In some arrangements, the recommended action is provided via the display 120 on the teller computing device 106. In this regard, the recommendation circuit 208 is communicably and operatively coupled to the display circuit 206 to facilitate the display of the recommended action on a teller computing device 106. The information provided with a recommended action may specify the drawer device 108 where the currency discrepancy was identified and at least one recommended action. As an example of a recommended action, the recommendation circuit 208 provides a recommendation for a "manual recount" of the drawer 1 contents. As another example, if there is a discrepancy in both drawer 1 and drawer 2 and the amount in drawer 1 is $100 less than expected and drawer 2 is $100 more than expected, then the recommended action states to "check drawer 2 for surplus."

Figure 3:
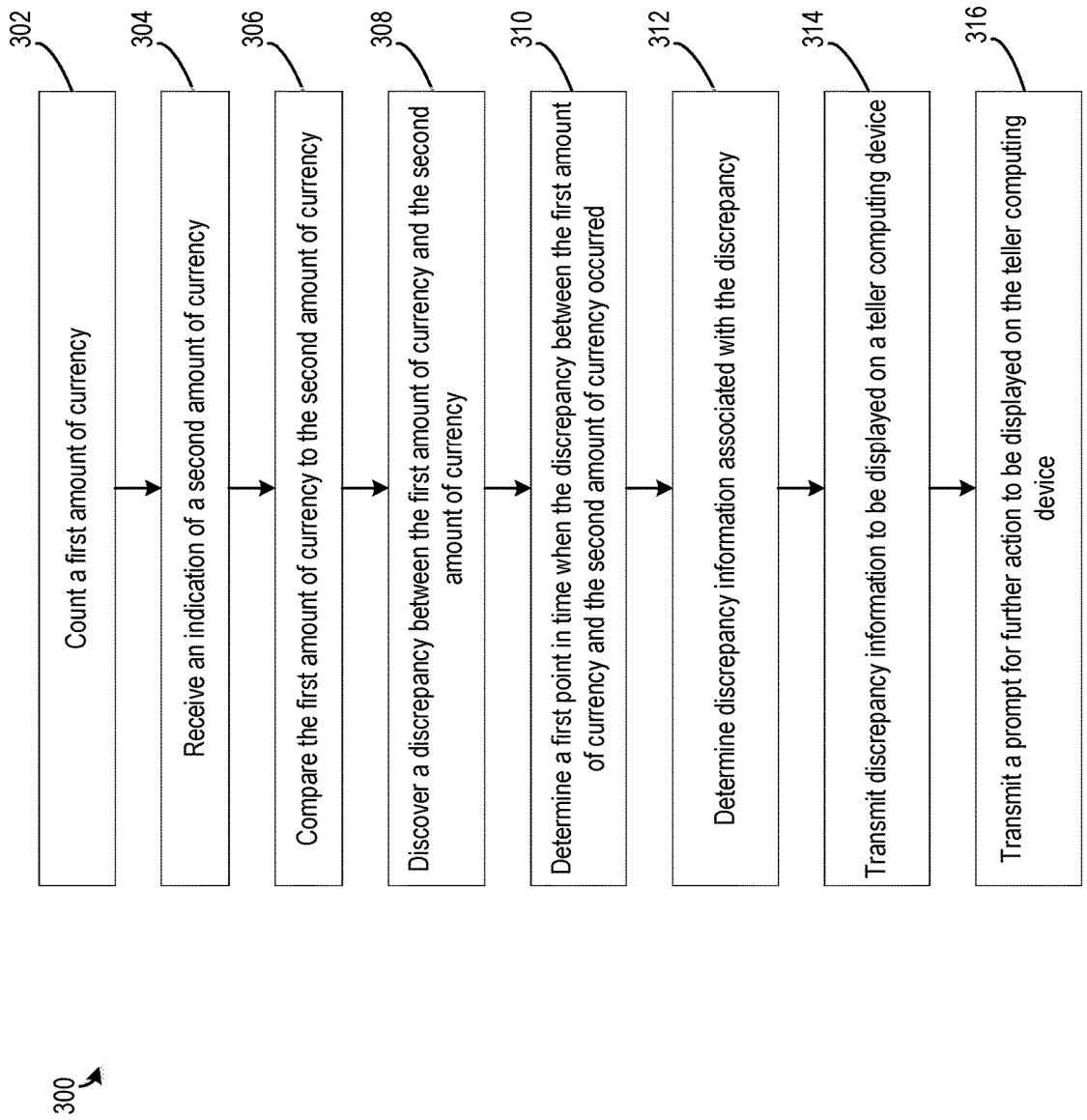
FIG. 3 is a flow diagram of a method of determining a currency discrepancy using the currency management system of FIGS. 1-2, according to an example embodiment.

Referring now to FIG. 3, an example method of managing, counting, and balancing currency in a drawer device at a financial institution is depicted. Method 300 may be implemented by the currency management system 146 of FIGS. 1-2, such that reference may be made to one or more components of FIGS. 1-2 in explaining method 300.

A first amount of currency is counted at 302. In some arrangements, the currency management system 146 counts the first amount of currency contained within a drawer device 108 (e.g., through the currency counting circuit 128 and the currency sensor 130). As mentioned above, counting currency within the drawer device 108 may be performed using a currency sensor 130. As noted, the currency sensor 130 may count paper money by either electrical or mechanical means, or by employing both mechanical and electrical functionality. The currency sensor 130 may additionally be equipped to distinguish denominations and/or types of currency. In addition to counting paper money, the currency sensor 130 may include a coin counter. Furthermore, a currency counterfeit determination mechanism may be used in combination with the currency sensor 130. Once the currency sensor 130 has counted the currency (including coins and paper money), the currency counting circuit 128 receives the first amount of currency. As noted, the first amount of currency is the actual amount of currency in the drawer device 108 that is compared to the expected amount of currency (referred to as the "second amount of currency").

An indication of a second amount of currency is received at 304. In some arrangements, the teller transaction circuit 202 receives the indication of the second amount of currency. As mentioned above, the teller transaction circuit 202 may receive transaction information from the transaction database 148. The transaction information may include the second amount of currency (e.g., the expected amount of currency), along with other information relating to the transaction between the customer and the teller at the financial institution. For example, when a transaction occurs at the financial institution, the customer may deposit a certain amount of money (e.g., $100) and the teller may enter into the teller computing device 106 that the amount of money has been deposited by the customer, thus denoting the expected amount of currency. In some embodiments, the second amount of currency may include a total netted amount of expected currency at the end of a set time period (e.g., at the end of a teller shift, end of each hour, end of each day).

The first amount of currency is compared to the second amount of currency at 306. In some arrangements, the discrepancy circuit 204 compares the first amount of currency to the second amount of currency. As mentioned above, the discrepancy circuit 204 may receive transaction information from the teller transaction circuit 202 indicating a second (or expected) amount of currency and a first (or actual) amount of currency. The discrepancy circuit 204 may then compare the amounts to identify a discrepancy between the amounts.

A discrepancy between the first amount of currency and the second amount of currency is discovered at 308. The discrepancy circuit 204 discovers the discrepancy between the first amount of currency and second amount of currency. As mentioned, using the transaction information received from the teller transaction circuit 202, the discrepancy circuit 204 may perform an analysis to determine that a discrepancy exists between the expected and actual amounts of currency. A discrepancy between the first amount of currency and the second amount of currency includes that the amounts do not match (e.g., a first amount of currency is $100 and a second amount of currency is $1000).

A first point in time when the discrepancy between the first amount of currency and the second amount of currency occurred is determined at 310. In some arrangements, the discrepancy circuit 204 determines the first point in time when the discrepancy occurred. As mentioned above, the currency management system 146 may be communicably and operatively coupled to the transaction database 148. The transaction database 148 stores information regarding the transactions that take place at the financial institution. Specifically, the transaction database 148 may store information regarding the transaction numbers, the time at which the transactions took place, and the amounts of currency deposited or withdrawn during those transactions. As noted above, the transaction information received from the transaction database 148 includes information relating to a set time period, such as receiving transaction information for transactions occurring during a specific teller shift, hour, or day, etc. The discrepancy circuit 204 may additionally receive information regarding transactions on a time-period basis (e.g., a sweep of data may occur every teller shift change, every hour, every few hours, etc.) from the teller transaction circuit 202. By taking into consideration the transaction information including, but not limited to, the transaction times and amounts of currency deposited and/or withdrawn, the discrepancy circuit 204 identifies a point in time at which there was first a discrepancy between the expected amount of currency and the actual amount of currency in a particular drawer device 108.

Discrepancy information associated with the discrepancy is determined at 312. In some arrangements, the discrepancy circuit 204 determines further discrepancy information. Similar to process 310, the discrepancy circuit 204 may be in communication with the teller transaction circuit 202 to receive transaction information. In some embodiments, part of this transaction information includes the account information relating to the transaction during which the discrepancy potentially occurred. In this regard, detailed account information is additionally received by the teller transaction circuit 202 from the accounts database 142. Furthermore, in some embodiments, the discrepancy circuit 204 uses transaction information to determine errors in teller data entry. For example, the teller accepts a $1000 deposit and incorrectly types into the teller computing device 106 that $100 was deposited, resulting in a typographical mistake. In yet another embodiment, the discrepancy circuit determines other potential sources of teller errors. For example, the teller may drop a coin and/or bill or may deliver more currency to a customer than is due. In some embodiments, the discrepancy circuit 204 determines that such a teller error may be the source of the discrepancy if the discrepancy is not a large amount. In other embodiments, the discrepancy circuit 204 does not use the discrepancy between the expected and actual currency to determine that teller error is the potential source of the discrepancy. Thus, in some arrangements, the discrepancy circuit 204 uses all information received from the transaction database 142 to determine further discrepancy information.

Discrepancy information to be displayed on a teller computing device is transmitted at 314. In some arrangements, the display circuit 206 transmits the discrepancy information to be displayed on the teller computing device 106. The display circuit 206 generates and provides a message to the teller computing device 106 to display the discrepancy information that is determined by the discrepancy circuit 204. As mentioned above, the display circuit 206 is communicably and operatively coupled to the discrepancy circuit 204 to receive identified discrepancy information. As mentioned above, the display circuit 206 creates, generates, establishes, updates, and maintains a list of potential discrepancies and any information associated therewith. The display includes a list of such information, wherein a teller (or any other user) using the teller computing device 106 may observe or search the list for information associated with the potential discrepancies.

A prompt for further action to be displayed on the teller computing device is transmitted at 316. In some arrangements, the display circuit 206 in combination with the recommendation circuit 208 transmits the prompt for further action to be displayed on the teller computing device 106. The recommendation circuit 208 may determine any possible further action that a teller may be able to take in regard to an identified discrepancy and relay that information to the display circuit 206 to transmit to the teller computing device 106. The display circuit 206 generates and provides a message to the teller computing device 106 to display the recommended further action. As mentioned above, recommended actions include, but are not limited to, a manual recount of the contents of a drawer device 108 and checking other drawer devices for missing or misplaced currency.

Figure 4:
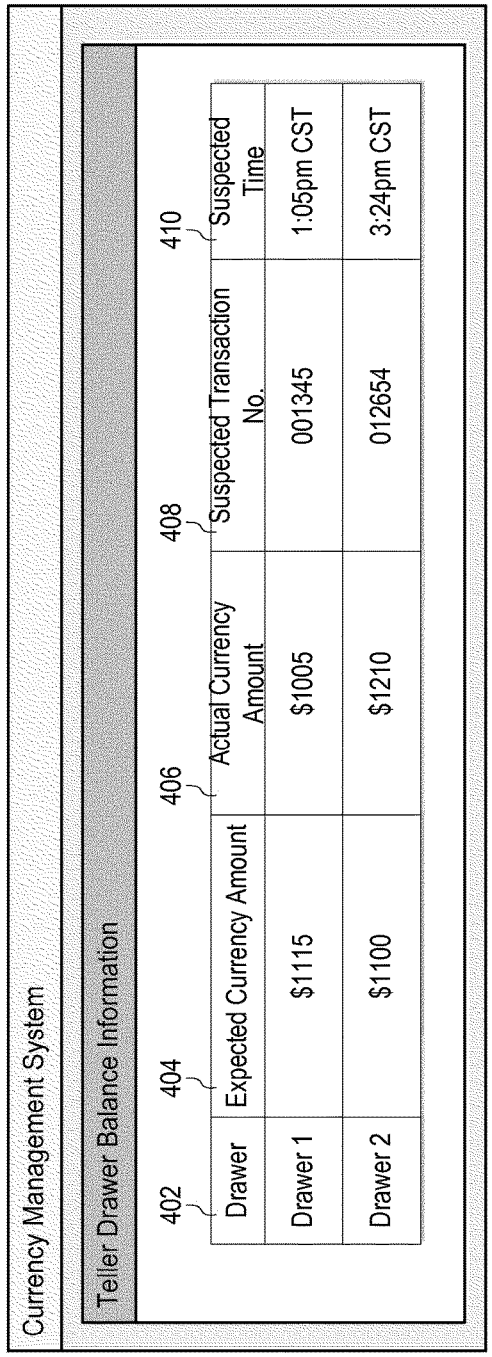
FIG. 4 is a diagram of a display generated by the currency management system of FIGS. 1-2, according to an example embodiment.

Referring now to FIG. 4, an example user interface 400 showing discrepancy information details for a plurality of drawer devices is shown, according to an example embodiment. The user interface 400 is an example user interface that can be presented to a teller via the currency management system 146. The user interface 400 allows a teller to view potential discrepancies that have occurred during a set time period (e.g., the shift of the teller, an hour, a few hours, etc.).

The user interface 400 displays a drawer device number 402. The drawer device number 402 indicates the drawer device that may have a potential discrepancy identified by the currency management system 146. As noted above, in some embodiments, the teller viewing the user interface 400 may only see the discrepancy information relating to the drawer device for which they are responsible. In other embodiments, the user interface 400 displays multiple drawer devices 402.

The user interface 400 further displays an expected currency amount 404 for each drawer device 402. The expected currency amount 404 is determined by the teller transaction circuit 202 using information from the transaction database 148. The expected currency amount 404 is the amount that the teller enters into the teller computing device 106 during a transaction with the customer. This information may be stored in the transaction database 148 for later use in the currency management system 146.

The user interface 400 further displays an actual currency amount 406 for each drawer device 402. The actual currency amount 406 is determined by the teller transaction circuit 202 using information from the drawer device 108, and in particular from the currency counting circuit 128. The currency sensor 130 counts the money within a particular drawer device 108 (e.g., drawer device 1, drawer device 2, etc.) and the currency counting circuit 128 receives that information and communicates it to the teller transaction circuit 202 within the currency management system 146. The actual currency amount 406 is the actual paper money and coins the teller receives and places into a drawer device during a transaction with the customer. In some embodiments, the actual currency amount 406 includes a total netted amount of currency at the end of a set time period.

For a given drawer device 402, the user interface 400 further displays a suspected transaction number 408. The suspected transaction number 408 indicates the transaction during which a potential discrepancy may have occurred. The suspected transaction number 408 is determined by the discrepancy circuit 204 using information received from the teller transaction circuit 202. Additionally, for a given drawer device 402, the user interface 400 further provides a suspected time 410 indicating the first time at which a discrepancy may have occurred. The suspected time 410 may be related to the suspected transaction number 408 and may be used by the currency management system 146 to determine during which transaction number 408 a potential discrepancy may have occurred.

Figure 5:
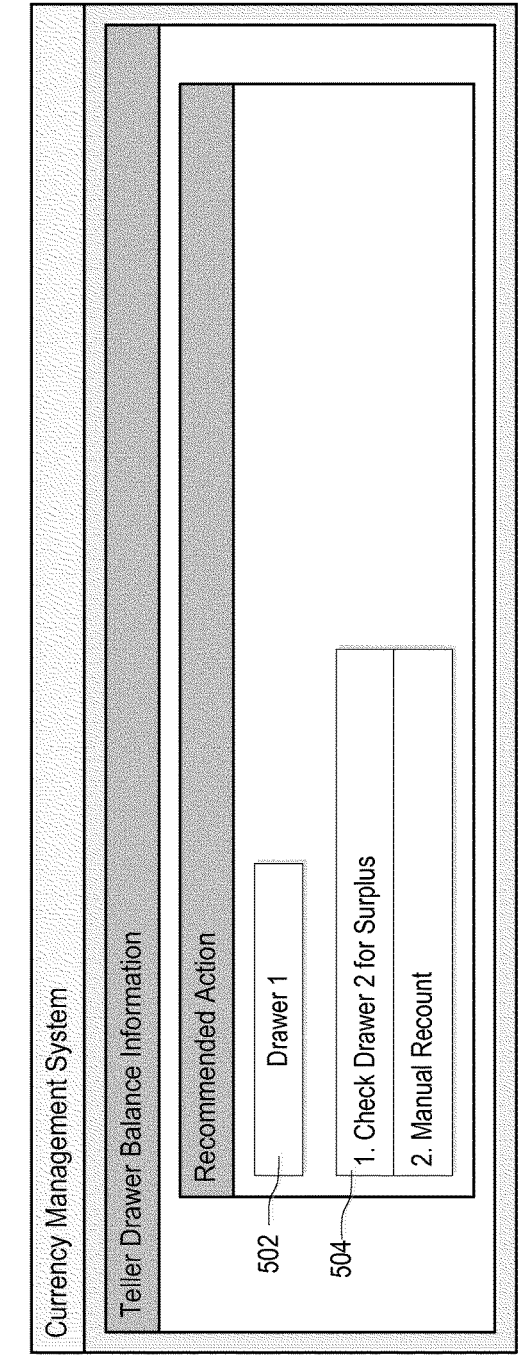
FIG. 5 is a diagram of another display generated by the currency management system of FIGS. 1-2, according to an example embodiment.

Referring now to FIG. 5 with reference to FIG. 4, a further pop-up window of details on recommended action is shown, according to an example embodiment. The pop-up window shown in FIG. 5 is displayed if a teller (or other user) selects a particular drawer device from the listed items in FIG. 4. For example, if a user selects the row for "drawer 1" in FIG. 4, the user interface 400 opens a further pop-up window (e.g., recommended action user interface 500) with further recommended action options. If the user selects "drawer 1," the currency management system 146 generates a recommended action user interface 500 in the form of a pop-up window. The recommended action user interface 500 includes a drawer device number 502 and a list of recommended actions 504.

As shown, the drawer device number 502 displays the name or number of the drawer device 108 selected from the user interface 400. Additionally, the list of recommended actions 504 displays the options for a user (e.g., teller) to take after a potential discrepancy has been identified by the currency management system 146. For example, the list of recommended actions 504 for Drawer 1 includes "1. Check Drawer 2 for Surplus" and "2. Manual Recount" options. Thus, in this example, the teller may either decide to go to drawer 2 to check if the currency has been misplaced or may do a manual recount of the currency. As mentioned with regard to FIG. 4, the teller may be aware of the amount of discrepancy such that a recount of the drawer should match that discrepancy (e.g., for drawer 1, the amount of discrepancy was found by the currency management system 146 to be $110.)

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more dedicated processors communicatively coupled to one or more dedicated memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc.

An example system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAIVI, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A system comprising:
a currency counting device; and
a processing circuit communicably coupled to the currency counting device, the processing circuit comprising a processor and memory, the memory structured to store instructions that are executable by the processor and cause the processing circuit to:
cause a first amount of currency to be counted by the currency counting device, wherein the first amount of currency is the actual amount of currency received by a first teller money drawer;
receive an indication of a second amount of currency, wherein the second amount of currency is an expected amount of currency;
compare the first amount of currency to the second amount of currency;
discover a discrepancy between the first amount of currency and the second amount of currency, wherein the discrepancy is that the first amount of currency is a discrepancy amount different than the second amount of currency;
determine a transaction number identifying a transaction during which the discrepancy occurred;
determine that a teller error is a potential source of the discrepancy based on the discrepancy amount being below a threshold;
determine a list of recommended actions based on the discrepancy, the list of recommended actions including checking a second teller money drawer for a surplus of currency corresponding to the discrepancy;
transmit discrepancy information, including the transaction number and an indication that the teller error is the potential source of the discrepancy based on the discrepancy amount being below the threshold, to be displayed on a teller computing device; and
transmit the list of recommended actions to be displayed on the teller computing device,
wherein the teller computing device is a wearable device.

2. The system of claim 1, wherein the processing circuit is further caused to determine a first point in time when the discrepancy between the first amount of currency and the second amount of currency occurred.

3. The system of claim 2, wherein the discrepancy information includes the first point in time when the discrepancy between the first amount of currency and the second amount of currency occurred.

4. The system of claim 1, wherein the processing circuit is further caused to determine an account associated with the discrepancy.

5. The system of claim 4, wherein the discrepancy information includes at least one of an account number of the account associated with the discrepancy and the name of an account holder of the account associated with the discrepancy.

6. The system of claim 1, wherein the first amount of currency includes at least one of coins and paper money.

7. The system of claim 1, wherein the list of recommended actions further includes a recount of the first amount of currency.

8. A method comprising:
counting, by a currency counting circuit, a first amount of currency, wherein the first amount of currency is the actual amount of currency received by a first teller money drawer;
receiving, by a teller transaction circuit, an indication of a second amount of currency, wherein the second amount of currency is an expected amount of currency;
comparing, by a discrepancy circuit, the first amount of currency to the second amount of currency;
discovering, by the discrepancy circuit, a discrepancy between the first amount of currency and the second amount of currency, wherein the discrepancy is that the first amount of currency is a discrepancy amount different than the second amount of currency;
determining, by the discrepancy circuit, a transaction number identifying a transaction during which the discrepancy occurred;
determining that a teller error is a potential source of the discrepancy based on the discrepancy amount being below a threshold;
determining, by a recommendation circuit, a list of recommended actions based on the discrepancy, the list of recommended actions including checking a second teller money drawer for a surplus of currency corresponding to the discrepancy;
transmitting, by a display circuit, discrepancy information including the transaction number and an indication that the teller error is the potential source of the discrepancy based on the discrepancy amount being below the threshold, to be displayed on a teller computing device; and
transmitting, by the discrepancy circuit, the list of recommended actions to be displayed on the teller computing device;
wherein the teller computing device is a wearable device.

9. The method of claim 8, further comprising determining, by the discrepancy circuit, a first point in time when the discrepancy between the first amount of currency and the second amount of currency occurred.

10. The method of claim 9, wherein the discrepancy information includes the first point in time when the discrepancy between the first amount of currency and the second amount of currency occurred.

11. The method of claim 8, further comprising determining, by the discrepancy circuit, an account associated with the discrepancy.

12. The method of claim 11, wherein the discrepancy information includes at least one of an account number of the account associated with the discrepancy and the name of an account holder of the account associated with the discrepancy.

13. The method of claim 8, wherein the first amount of currency includes at least one of coins and paper money.

14. The method of claim 8, wherein the list of recommended actions further includes a recount of the first amount of currency.

15. An apparatus, comprising:
a currency counting circuit structured to count a first amount of currency, wherein the first amount of currency is the actual amount of currency received by a first teller money drawer;

a teller transaction circuit structured to receive an indication of a second amount of currency, wherein the second amount of currency is an expected amount of currency;

a discrepancy circuit structured to:
- compare the first amount of currency to the second amount of currency;
- discover a discrepancy between the first amount of currency and the second amount of currency, wherein the discrepancy is that the first amount of currency is a discrepancy amount different than the second amount of currency;
- determine a transaction number identifying a transaction during which the discrepancy occurred; and
- determine that a teller error is a potential source of the discrepancy based on the discrepancy amount being below a threshold;

a recommendation circuit structured to determine a list of recommended actions based on the discrepancy, the list of recommended actions including checking a second teller money drawer for a surplus of currency corresponding to the discrepancy; and a display circuit structured to transmit discrepancy information and the list of recommended actions to be displayed on a teller computing device, the discrepancy information including the transaction number and an indication that the teller error is the potential source of the discrepancy based on the discrepancy amount being below the threshold;

wherein the teller computing device is a wearable device.

16. The apparatus of claim 15, wherein the list of recommended actions further includes a recount of the first amount of currency.

17. The apparatus of claim 15, wherein the discrepancy circuit is further structured to determine a first point in time when the discrepancy between the first amount of currency and the second amount of currency occurred.

18. The apparatus of claim 15, wherein the discrepancy circuit is further structured to determine an account associated with the discrepancy.

19. The apparatus of claim 18, wherein the discrepancy information includes at least one of an account number of the account associated with the discrepancy and the name of an account holder of the account associated with the discrepancy.

* * * * *